(12) United States Patent
Ueda et al.

(10) Patent No.: US 6,409,394 B1
(45) Date of Patent: Jun. 25, 2002

(54) OPTICAL CONNECTOR

(75) Inventors: Tomohiko Ueda; Kenichiro Ohtsuka; Toshiaki Kakii, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/531,506

(22) Filed: Mar. 21, 2000

(51) Int. Cl.[7] .................................................. G02B 6/36
(52) U.S. Cl. ............................................ 385/80; 385/83
(58) Field of Search ...................................... 385/80, 83

(56) References Cited

U.S. PATENT DOCUMENTS 5,363,461 A * 11/1994 Bergmann
5,680,493 A * 10/1997 Naitoh
6,062,740 A * 5/2000 Ohtsuka et al.

FOREIGN PATENT DOCUMENTS

| JP | 61-156207 | 7/1986 |
| JP | 11084161 | 3/1999 |
| JP | 11248965 | 9/1999 |
| JP | 11248968 | 9/1999 |

* cited by examiner

Primary Examiner—Hung N. Ngo
(74) Attorney, Agent, or Firm—McDermott, Will & Emery

(57) ABSTRACT

In an optical connector for securing an optical fiber by inserting it into an optical fiber positioning hole of a connector ferrule body, an end face of the optical fiber is disposed within the optical fiber positioning hole, a predetermined length region of the optical fiber on the end face side is in a free state adapted to expand and contract, and the end face of the optical fiber is buried in a refractive index matching material filling near an opening portion of the optical fiber positioning hole.

4 Claims, 18 Drawing Sheets

OPTICAL CONNECTOR

BACKGROUND OF THE INVENTION

1. Field of the Invention

The present invention relates to an optical connector which is formed by processing an end portion of an optical fiber and used for butting end faces of optical fibers against each other so as to optically connect them to each other.

2. Related Background Art

A conventional optical connector has been produced by the steps of causing an adhesive to flow into an optical fiber insertion hole formed in a connector ferrule body, inserting an optical fiber therein, so as to secure the optical fiber to the connector ferrule with the adhesive, and then grinding a connection end face of the optical connector. As a consequence, the connection end face of the optical connector and the tip face of the optical fiber are made flush with each other, so that connector ferrules can securely couple with each other. Japanese Patent Application Laid-Open No. SHO 61-156207 discloses an example of such techniques.

It has been difficult for such an optical connector to securely prevent the adhesive from attaching to the tip face of the connector ferrule. A precise end face grinding step is necessary for eliminating the attached adhesive, so that it takes time to assemble the optical connector, while expensive equipment is necessary for carrying out precise grinding, and so forth. Hence, this optical connector has not been suitable for assembly at the site of installation.

SUMMARY OF THE INVENTION

In order to overcome the above-mentioned problems, it is an object of the present invention to provide an optical connector which can shorten its assembling time and can be assembled easily at a lower cost.

In the optical connector in accordance with the present invention, for overcoming the above-mentioned problems, an end face of an optical fiber is disposed within a fiber positioning hole, a part of the optical fiber having a predetermined length from the end face side thereof is held axially slidable within the optical fiber positioning hole, the optical fiber is secured by an area thereof subsequent to the predetermined length part to a connector ferrule body, and a refractive index matching material is filled the optical fiber positioning hole at least from a front end face of the connector ferrule body to the end face of the optical fiber.

In this optical connector, an end face of the optical fiber is formed into a state buried in the optical fiber positioning hole and retracted from the front end face of the connector ferrule (corresponding to the connection end face of the optical connector). Also, the optical fiber positioning hole is filled with the refractive index matching material at least from the front end face of the connector ferrule to the end face of the optical fiber. When such optical connectors are caused to face each other and optical fibers are optically connected to each other, the refractive index matching material is interposed between the end faces of the optical fibers, whereby optical connections can be realized with a low loss regardless of the form of the tip faces of optical fibers. As a consequence, the conventional precise grinding step becomes substantially unnecessary, whereby the assembling time of the optical connector can be shortened. Also, since the end portion of the optical fiber is disposed axially slidable within the optical fiber positioning hole, the optical fiber is allowed to thermally expand and contract, whereby loss can be kept from increasing due to extra stresses applied to the optical fiber.

Behind the optical fiber positioning hole, the connector ferrule body may be provided with an optical fiber alignment groove, so that the optical fiber is contained in the optical fiber alignment groove and secured thereto by bonding. Alternatively, the optical connector may further comprise an optical fiber pressing and securing member for securing the optical fiber contained in the optical fiber alignment groove by pressing the optical fiber against a wall face of the optical fiber alignment groove.

According to these configurations, the optical fiber alignment groove is used as a guide groove, so that it becomes easier to insert the optical fiber into the optical fiber positioning hole, while the adhesive can effectively be prevented from flowing into the optical fiber positioning hole in the case where the optical fiber is secured with the adhesive in particular, whereby they are advantageous in that manufacture becomes easier.

Preferably, the end face of the optical fiber is treated by an edge elimination. When the end face of the optical fiber is rounded by an edge elimination, the insertion of the optical fiber becomes easier, and the tip face of the optical fiber can effectively be restrained from chipping off within the optical fiber positioning hole, whereby operations can be made faster. For the edge elimination, electrical discharge machining or grinding can be employed.

The connector ferrule body may have a plurality of optical fiber positioning holes each containing an optical fiber. As a consequence, optical connections with a low loss can be realized when making an optical connector in which a plurality of optical fibers are end-coupled even if the end faces of the optical fibers do not accurately align with each other. For example, even when an end portion of an optical fiber ribbon is processed to yield an optical connector, the tip faces of individual optical fibers are allowed to be somewhat uneven without being processed to accurately align with each other when the end portion of the optical fiber ribbon is processed before the optical fibers of the optical fiber ribbon are inserted into the connector ferrule. Hence, the cutting can be carried out rapidly, which contributes to shortening the assembling time of the optical connector.

The present invention will become more fully understood from the detailed description given hereinbelow and the accompanying drawings. They are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

BRIEF DESCRIPTION OF THE DRAWINGS

FIGS. 26 and 27 are sectional views of a main part and the whole of a fiber positioning hole in a fourth embodiment of the optical connector in accordance with the present invention, respectively, whereas FIG. 29 is a sectional view showing a modified mode of the optical connector in accordance with the fourth embodiment, whereas

DETAILED DESCRIPTION OF THE PREFERRED EMBODIMENTS

Figure 1:
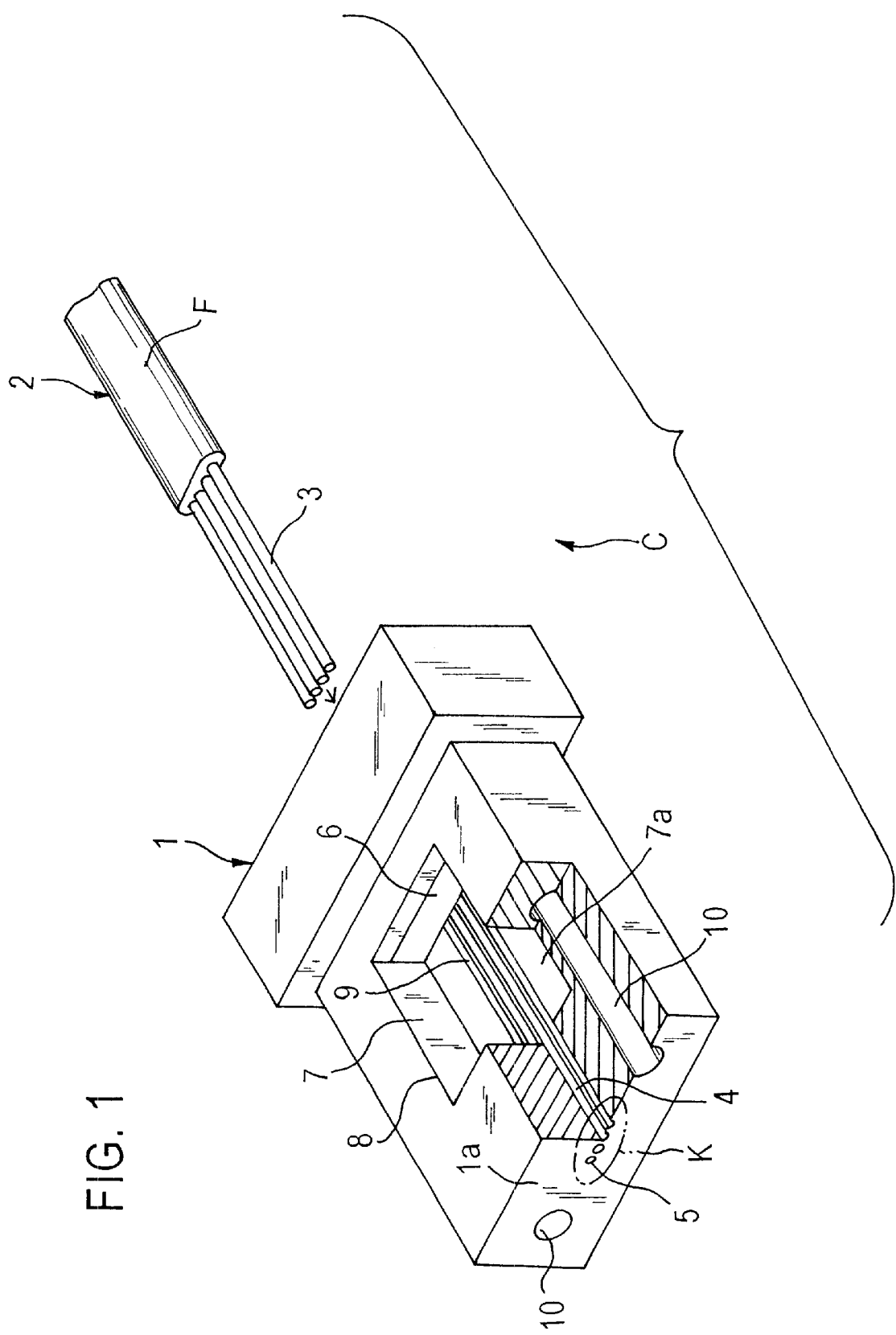
FIG. 1 is an exploded perspective view of a first embodiment of the optical connector in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is an exploded perspective view of a first embodiment of the optical connector C in accordance with the present invention. The connector ferrule 1 shown in this drawing is made of a resin (may be made of zirconia or glass as well) and formed substantially like a rectangular parallelepiped. The front portion (the left side in the drawing) of the connector ferrule 1 is provided with four optical fiber positioning holes 4. Each of the optical fiber positioning holes 4 receives and positions one of four optical fibers 3 exposed from the tip portion of an optical fiber ribbon 2 (hereinafter also referred to as "fiber ribbon"), and has a diameter of 126 $\mu$m to 127 $\mu$m with respect to the optical fiber 3 having a diameter of 125 $\mu$m. The individual optical fiber positioning holes 4 linearly extend in parallel from the front end face 1a of the connector ferrule 1, while the front end openings of the optical fiber positioning holes 4 correspond to their respective optical connection ports 5. The rear portion of the connector ferrule 1 is provided with an optical fiber introduction port 6 for introducing the optical fibers into the connector ferrule 1.

Figure 15:
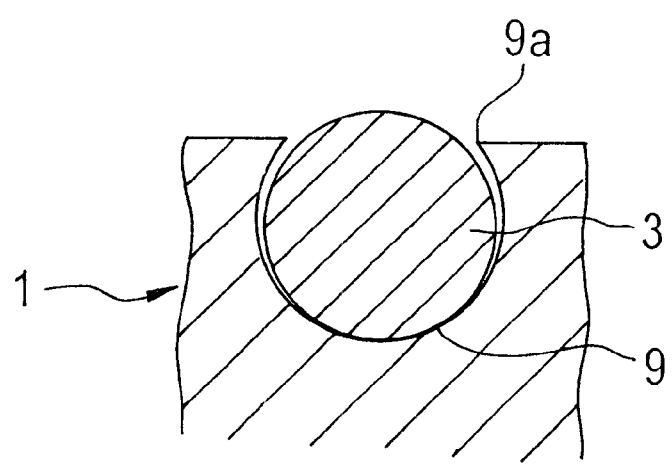
FIG. 15 is an enlarged sectional view showing an optical fiber alignment groove having a C-shaped cross section.

Disposed between the optical fiber introduction port 6 and the optical fiber positioning holes 4 is an optical fiber bonding cavity 7 for containing an adhesive R, whereas the top portion of the cavity 7 is formed with an adhesive filling window 8 shaped like a rectangular opening for pouring the adhesive therein. The bottom face 7a of the cavity 7 is provided with four optical fiber alignment grooves 9 extending over the whole length of the cavity 7, whereas each optical fiber alignment groove 9 is located on an extension of its corresponding optical fiber positioning hole 4 and extends between the optical fiber positioning hole 4 and optical fiber introduction port 6. Further, each optical fiber alignment groove 9 is formed so as to have a C-shaped cross section and extends with a diameter identical to that of the optical fiber positioning hole 4 (see FIG. 15). Flanking the four optical connection ports 5, a pair of guide pin holes 10 for receiving their corresponding guide pins (not depicted) are opened in the front end face 1a of the connector ferrule 1.

Figure 2:
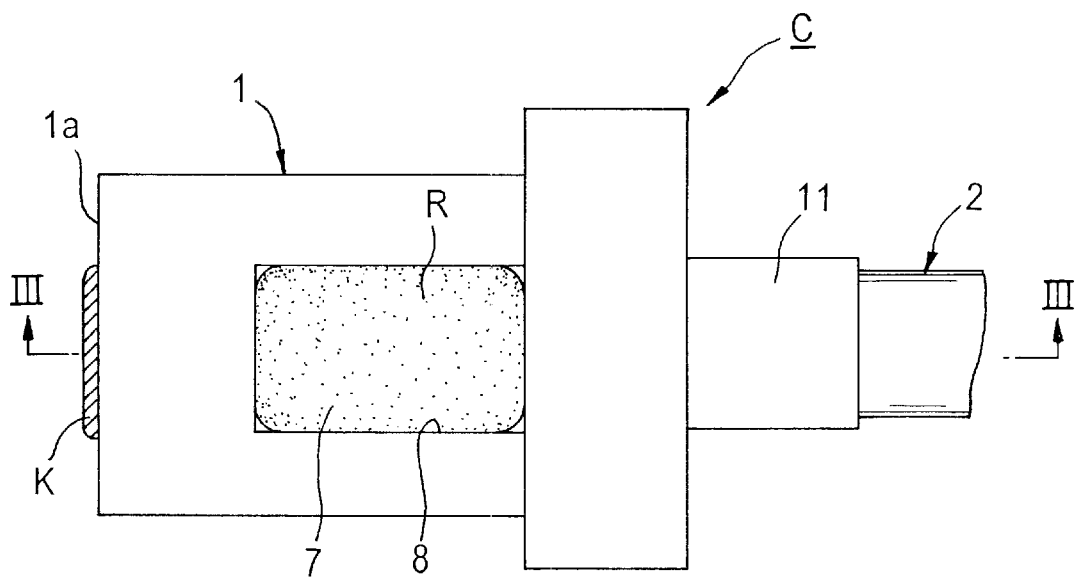
FIG. 2 is a plan view thereof.
Figure 3:
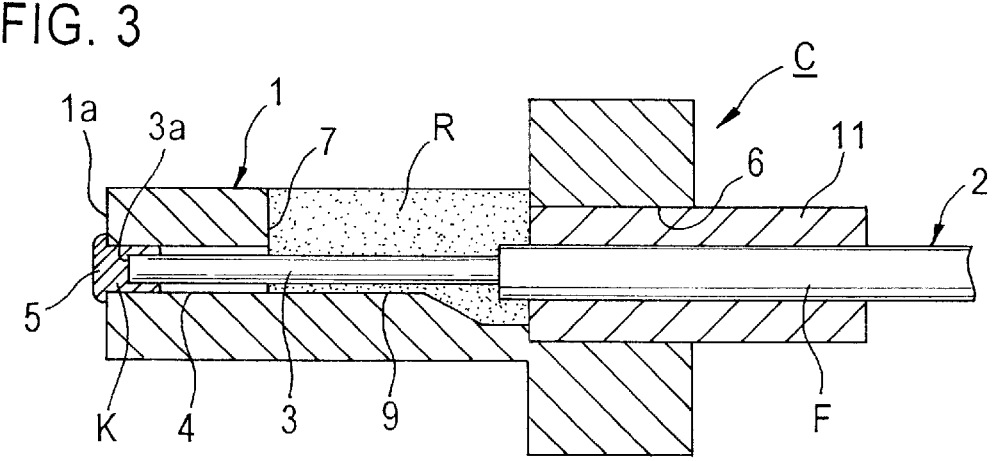
FIG. 3 is a sectional view thereof taken along the line III—III of FIG. 2.
Figure 4:
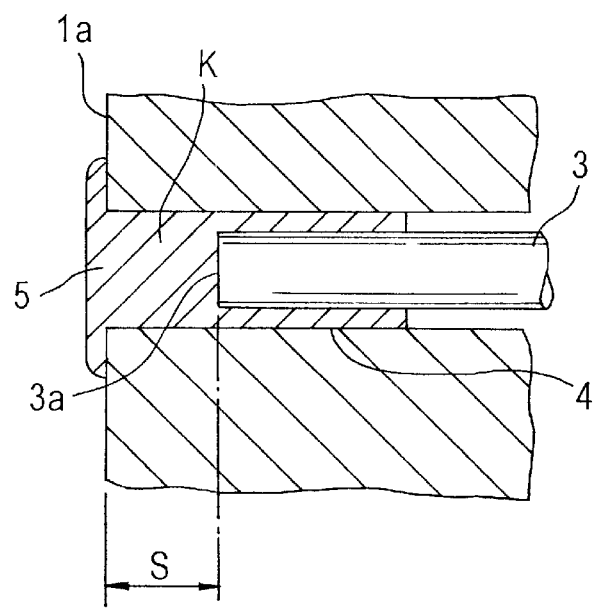
FIG. 4 is an enlarged sectional view of a main part of FIG. 3.
Figure 5:
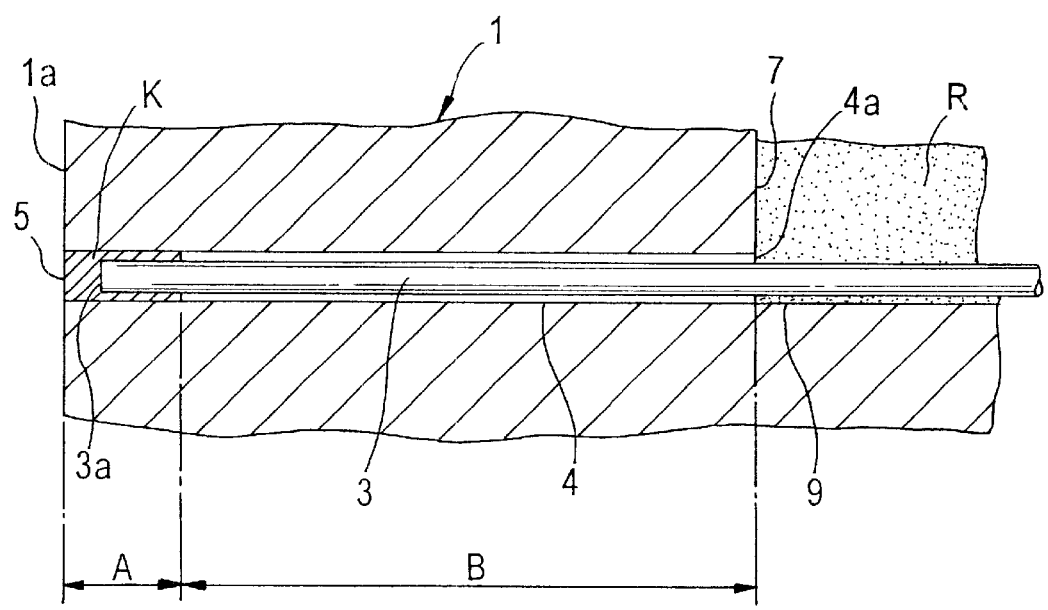
FIG. 5 is an enlarged sectional view showing a state where an optical fiber is inserted in an optical fiber positioning hole of FIG. 3.

As shown in FIGS. 2 and 3, an optical fiber 3 inserted from the optical fiber introduction port 6 of the connector ferrule 1 is introduced into and disposed in an optical fiber positioning hole 4 along an optical fiber alignment groove 9. Here, as shown in FIGS. 4 and 5, the tip face 3a of the optical fiber 3 is retracted from the front end face 1a of the connector ferrule 1 with an amount of retraction S on the order of 5 $\mu$m to 10 $\mu$m so as to be disposed within the optical fiber positioning hole 4. Near its optical connection port 5, the optical fiber positioning hole 4 is filled with a refractive index matching material K which is silicone type matching grease or the like, whereby the part in which the refractive index matching material K exists becomes a refractive index matching material area A. It will be sufficient if the refractive index matching area A covers at least a part of the optical fiber 3 near the tip face 3a of the optical fiber 3.

Behind the refractive index matching material area A in the optical fiber positioning hole 4, an air layer area B is formed so as to be continuous therewith and extend to the vicinity of the rear end 4a of the optical fiber positioning hole 4. In the air layer area B, a very slight air gap is formed between the peripheral face of the optical fiber 3 and the wall face of the optical fiber positioning hole 4. Further, as shown in FIGS. 2, 3, and 5, the cavity 7 is filled with the adhesive R, which secures the optical fiber 3 to the optical fiber alignment groove 9, thereby more firmly fixing the optical fiber 3 to the connector ferrule 1. Since there is only a very small difference between the diameter of the optical fiber 3 and the diameter of the optical fiber positioning hole 4, the intrusion of the adhesive R to the optical fiber positioning hole 4 from the rear end 4a thereof can be substantially completely prevented at the time when the cavity 7 is filled with the adhesive R. Depending on the diameter of the rear end 4a, however, the adhesive R may slightly intrude the inside from the rear end 4a, even then the intrusion length can be shortened by the existence of the air layer area B.

In the refractive index matching material area A and air layer area B, the optical fiber 3 is in a free state and allows the tip portion of the optical fiber 3 to axially expand and contract when the optical fiber 3 expands and contracts upon changes in temperature. Therefore, as compared with the case where the optical fiber 3 is secured up to an end portion thereof, unnecessary stresses do not apply to the tip portion, whereby stable optical connections can be carried out.

The optical connector C thus configured is suitably applicable to MT connectors, such as those capable of high-speed switching like CATS (Cable Transfer Splicing) in particular. Namely, it is not necessary to increase the cutting precision or grinding precision of the tip face 3a of the optical fiber 3, which greatly contributes to shortening the operation time for machining the tip of the optical fiber 3 into a connector form. Also, the tip face 3a of the optical fiber 3 does not project out of the optical connection port 5, whereby operators would not unintentionally come into contact with the tip face 3a of the optical fiber 3 during the handling thereof.

The amount of retraction of the optical fiber 3 is designed such that, in view of the coefficient of linear expansion of members constituting the optical connector C, the tip face 3a of the optical fiber 3 does not project out of the front end face 1a of connector ferrule 1 even when temperature changes.

Here, a rubber boot 11 fitted to the fiber ribbon 2 is inserted into the optical fiber introduction port 6 of the connector ferrule 1, whereby the fiber ribbon 2 is prevented from bending.

A method of assembling thus configured optical connector C will be explained with reference to an example thereof.

Figure 6:
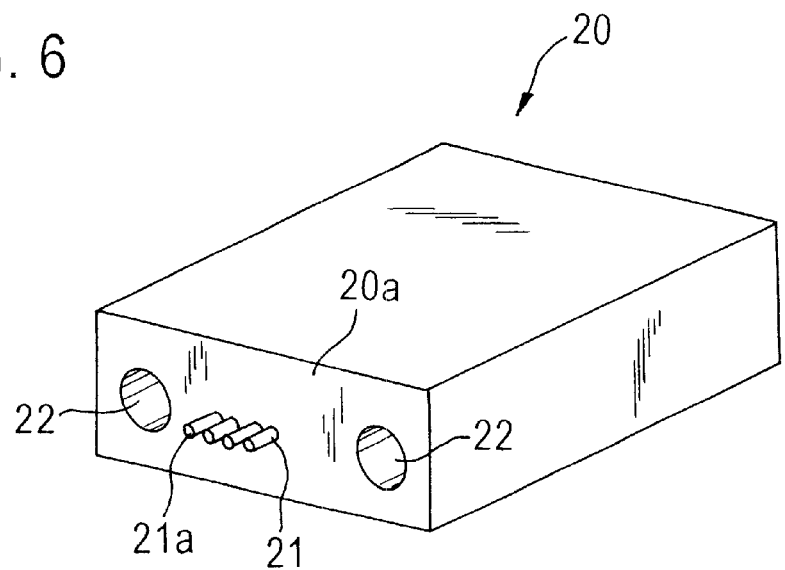
FIG. 6 is a perspective view showing an optical fiber pressing member utilized for assembling the optical connector in accordance with the present invention.

First, an optical fiber pressing member 20, made of a resin, having a substantially rectangular parallelepiped form as shown in FIG. 6 is prepared. The front face of the optical fiber pressing member 20 has a flat connector ferrule abutting face 20a adapted to abut against the front end face 1a of the connector ferrule 1, whereas the connector ferrule abutting face 20 is provided with four cylindrical positional projections 21 arranged in a lateral row in conformity to the number of the optical fiber positioning holes 4. Preferably, the outside diameter of each positioning projection 21 is set to about half the inside diameter of each optical fiber positioning hole 4, for example. The respective tips of the positioning projections 21 are provided with circular optical fiber pressing faces 21a arranged in a lateral row, whereas each optical fiber pressing face 21a projects from the connector ferrule abutting face 20a by about 5 μm. The positioning projections 21 are flanked by a pair of guide pin insertion holes 22 corresponding to the guide pin holes 10 of the connector ferrule 1.

Figure 7:
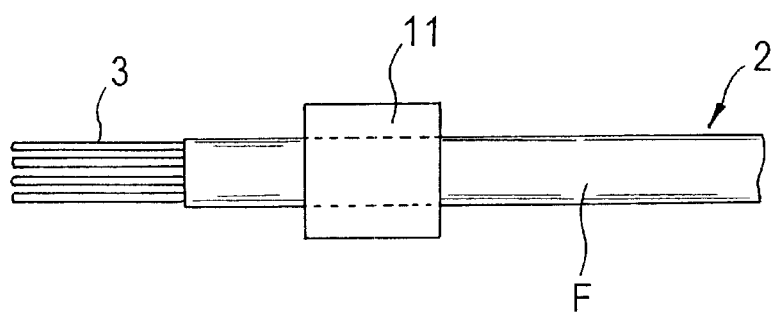
FIG. 7 is a plan view showing a coated optical fiber cut into a predetermined length used for the optical connector in accordance with the present invention.
Figure 8:
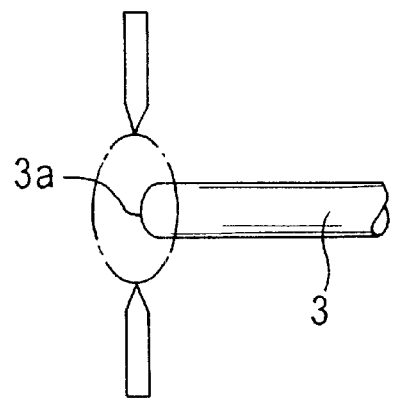
FIGS. 8 and 9 are enlarged views showing electrical discharge machining and grinding states of an optical fiber, respectively.
Figure 9:
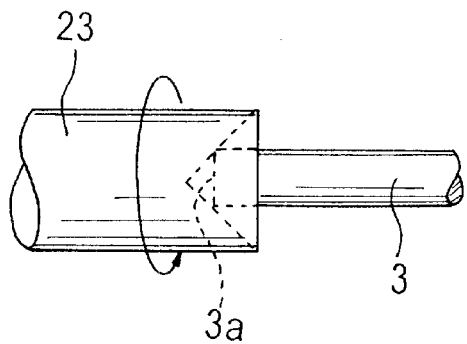

Then, as shown in FIG. 7, the fiber ribbon 2 is inserted into the rubber boot 11, and a predetermined length of a coating portion F from the tip portion of the fiber ribbon 2 is removed by a heating type remover or the like, so as to expose four optical fibers 3. The coating debris is wiped off with alcohol or the like. Subsequently, the respective tips of the optical fibers 3 are cut with a cutter or the like such that they are exposed by a predetermined length, and their end faces are arranged in a row. Then, as shown in FIG. 8, the tip faces 3a of the optical fibers 3 are treated by an edge elimination such as electrical discharge machining. This process aims at preventing the end faces of optical fibers 3 from chipping of f when the optical fiber 3 comes into contact with the connector ferrule 1, and making the insertion easier so as to accelerate the inserting operation. Here, the edge elimination may be carried out by mechanically grinding the tip faces 3a of optical fibers 3 with a grinding rotor 23 as shown in FIG. 9 or manually grinding them.

Figure 10:
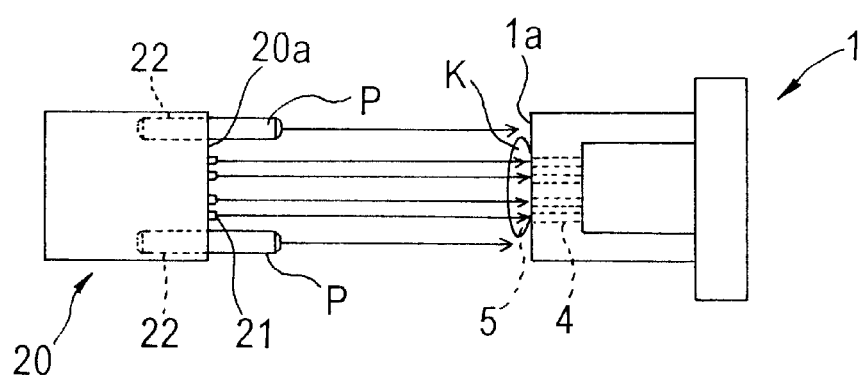
FIGS. 10 and 11 are plan views showing states before and after a connector ferrule is assembled with the optical fiber pressing member, respectively.

Subsequently, as shown in FIG. 10, a grease-like silicone type refractive index matching material K is applied from the front end face 1a of the connector ferrule 1 so as to block the respective optical connection ports 5 of the optical fiber positioning holes 4. Thereafter, while in a state where guide pins P are inserted into their corresponding guide pin insertion holes 22 of the optical fiber pressing member 20, the free end of each guide pin P is inserted into its corresponding guide pin insertion hole 10 (see FIG. 1) of the connector ferrule 1. While the positioning projections 21 of the optical fiber pressing member 20 are inserted into their corresponding optical fiber positioning holes 4 of the connector ferrule 1 as being guided by the guide pins P, the connector ferrule abutting face 20a of the optical fiber pressing member 20 is caused to abut against the front end face 1a of the connector ferrule 1.

As a result, the refractive index matching material K is interposed between the connector ferrule abutting face 20a of the optical fiber pressing member 20 and the front end face 1a of the connector ferrule 1. In the optical connection port 5 portion of the connector ferrule 1, the positioning projections 21 push the refractive index matching material K into their corresponding optical fiber positioning holes 4 when inserted into the latter. For keeping this state, an unshown clip may hold and secure the connector ferrule 1 and the optical fiber pressing member 20 from both sides.

Figure 11:
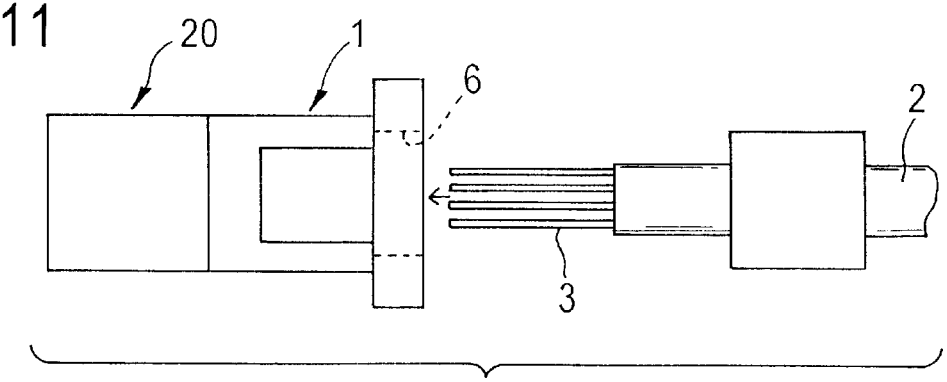
Figure 12:
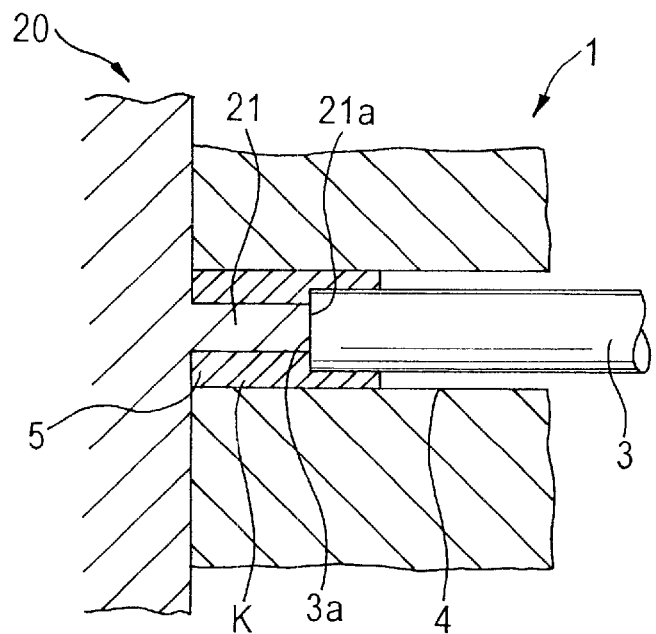
FIG. 12 is an enlarged sectional view of a main part showing a state where an optical fiber is inserted in the connector ferrule.

Thereafter, as shown in FIG. 11, the optical fibers 3 are inserted from the optical fiber introduction port 6 of the connector ferrule 1 so as to enter their corresponding optical fiber positioning holes 4. Then, as shown in FIG. 12, the fiber ribbon 2 is advanced to such an extent that the tip face 3a of each optical fiber 3 abuts to the optical fiber pressing face 21a of its corresponding positioning projection 21. As a result, the tip face 3a of each optical fiber 3 is disposed within its corresponding optical fiber positioning hole 4 at a position retracted from the front end face 1a of the connector ferrule 1 by about 5 μm (the amount of projection of the positioning projections 21). Further, the optical connection port 5 portion of each positioning hole 4 is filled with the silicone type refractive index matching material K, whereby the tip face 3a of each optical fiber 3 is completely buried in the refractive index matching material K.

Figure 13:
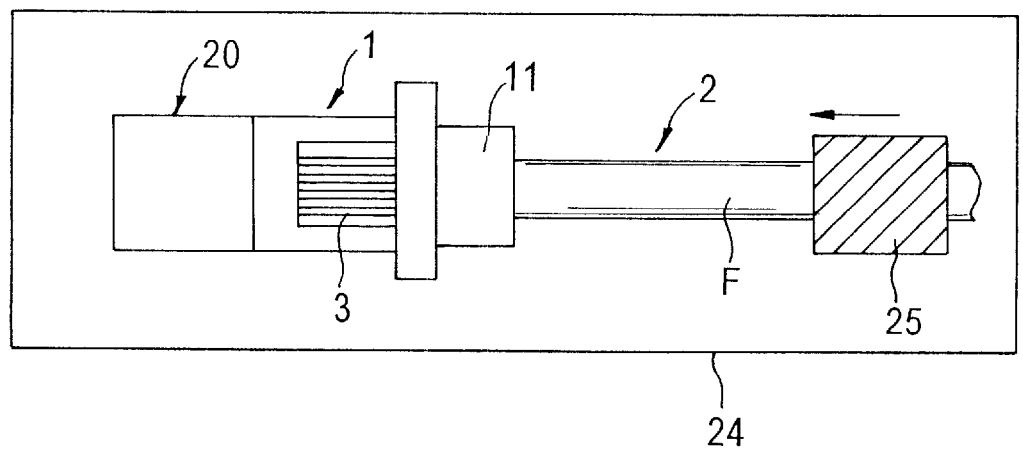
FIG. 13 is a plan view showing a state where an alignment load is applied to the coated optical fiber.

Subsequently, as shown in FIG. 13, the fiber ribbon 2 is pressed from there behind in a state where the connector ferrule 1 and the optical fiber positioning member 20 are fixed on a base plate 24 while a fiber holder 25 slidable to-and-fro on the base plate 24 holds the coating portion F of the fiber ribbon 2. Here, applied is such an alignment load (a load applying 200 g, for example, to four optical fibers 3 from therebehind) that the tip faces 3a of all the optical fibers 3 abut against the respective optical fiber pressing faces 21a of the positioning projections 21.

Figure 14:
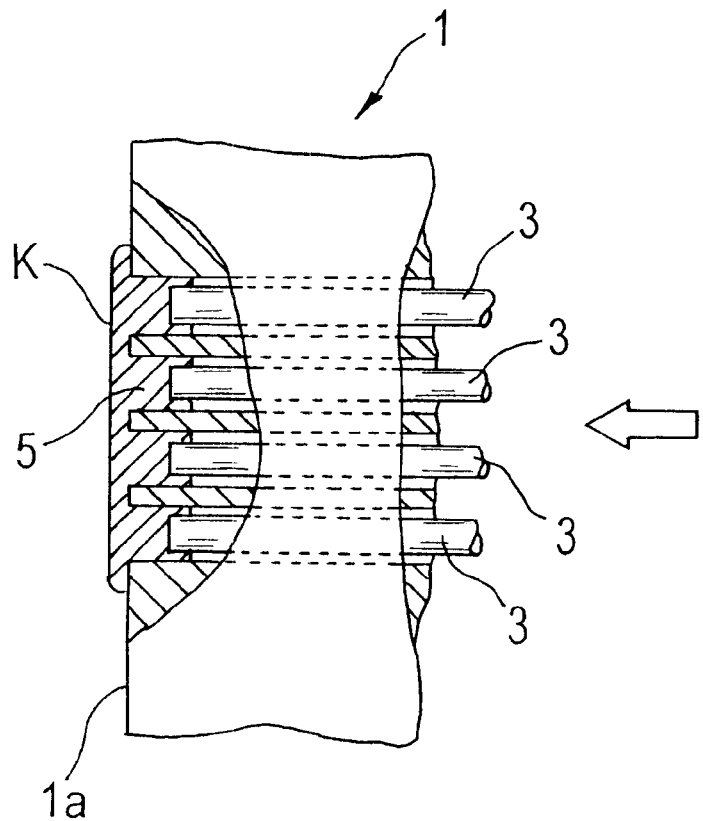
FIG. 14 is a sectional view showing a state where tip faces of optical fibers are arranged in a row within optical fiber positioning holes.

As a consequence, the tip faces 3a of the optical fibers 3 are forcibly arranged in a row as shown in FIG. 14. In this case, since it is necessary to absorb the amount of compression of each optical fiber 3, each optical fiber alignment groove 9 preferably has a C-shaped cross section while a slit-like opening 9a with a width smaller than the diameter of the optical fiber 3 is formed in the upper part thereof. Such an opening 9a can prevent the optical fiber 3 from jumping out and allows the adhesive R to flow into the optical fiber alignment groove 9.

Figure 16:
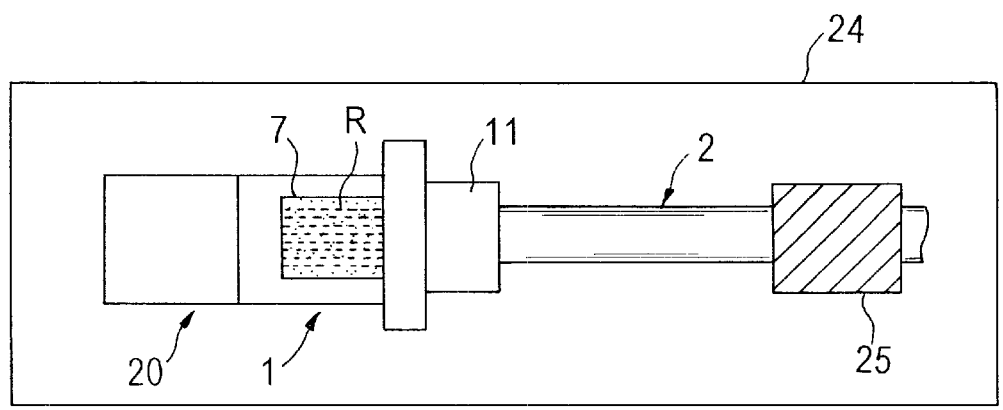
FIG. 16 is a plan view showing a state where the connector ferrule is filled with an adhesive.

Thereafter, as shown in FIG. 16, the optical fiber bonding cavity 7 of the connector ferrule 1 is filled with an epoxy type thermosetting adhesive R. In this state, the connector ferrule 1 is appropriately heated with an unshown heating apparatus, so as to cure the adhesive R by heat. In this last step, while the connector ferrule 1 and optical fibers 3 change their dimensions more or less due to expansion or contraction (the expansion and contraction of the connector ferrule 1 made of a resin being greater in particular), the tip faces 3a of the optical fibers 3 would not project out of the front end face 1a of the connector ferrule 1 since they are retracted beforehand.

Figure 17:
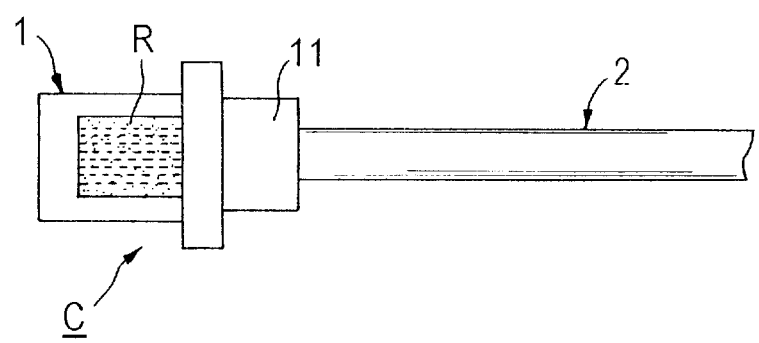
FIG. 17 is a plan view showing an optical connector having completed its assembly.

Then, as shown in FIG. 17, the optical fiber pressing member 20 is removed from the connector ferrule 1, whereby the operation of assembling the fiber ribbon 2 to the connector ferrule 1 is completed in a state where the respective tip faces 3a of the optical fibers 3 are securely arranged in a row (see FIG. 14). In each optical fiber positioning hole 4 in this case, an air layer area B is formed between the refractive index matching material area A filled with the refractive index matching material K and the fixed area filled with the adhesive R (see FIG. 5). When a UV-curing adhesive or cold setting adhesive is employed as the adhesive R, the connector ferrule 1 and the optical fibers 3 can be inhibited from expanding and contracting.

Figure 18:
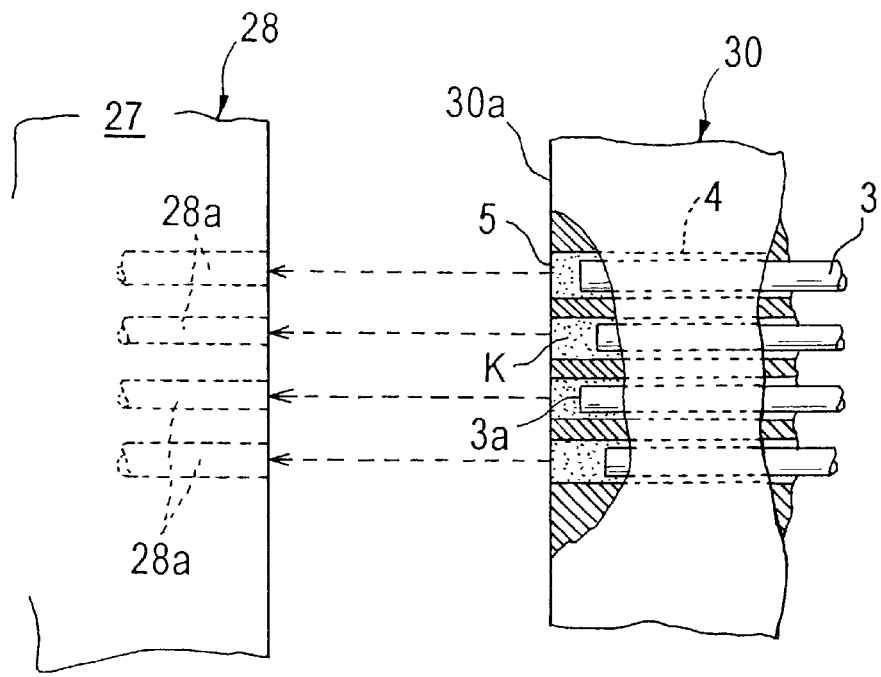
FIG. 18 is a plan view showing a state where tip faces of optical fibers are buried within a connector ferrule in an uneven fashion.

In this optical connector, as shown in FIG. 18, the respective tip faces 3a of four optical fibers 3 may be buried in the refractive index matching material K disposed within the optical fiber positioning holes 4 without being arranged in a row. Namely, when disposed with in the individual optical fiber positioning holes 4 arranged in a row, the respective tip faces 3a of the optical fibers 3 may be positioned unevenly. It is because of the fact that independent connections are made in the respective optical fibers 3. Hence, when the respective optical fibers 3 are optically connected to four optical fibers 28a disposed in a connector ferrule 28 of another optical connector 27, connections independent from each other are effected in the respective pairs of optical fibers 3 and 28a by way of the refractive index matching material K in the optical fiber positioning holes 4.

In the process of making this modified mode, the respective tip faces 3a of the optical fibers 3 may be cut somewhat roughly with an alignment error of several micrometers without being cut so as to align with each other in the preliminary step of inserting the optical fibers 3 into the connector ferrule 30, whereby the cutting can be effected rapidly. Even if the tip faces of the optical fibers 3 are cut obliquely in this case, it will be less likely to affect connections. Hence, after the optical fibers 3 with uneven end faces are assembled into the connector ferrule 30, it is not necessary to adjust the positions of the end faces of optical fibers 3, whereby the operation of assembling the optical fibers 3 becomes very fast. Here, the refractive index matching material K may be applied at the time of use instead of the time of assembly.

Figure 19:
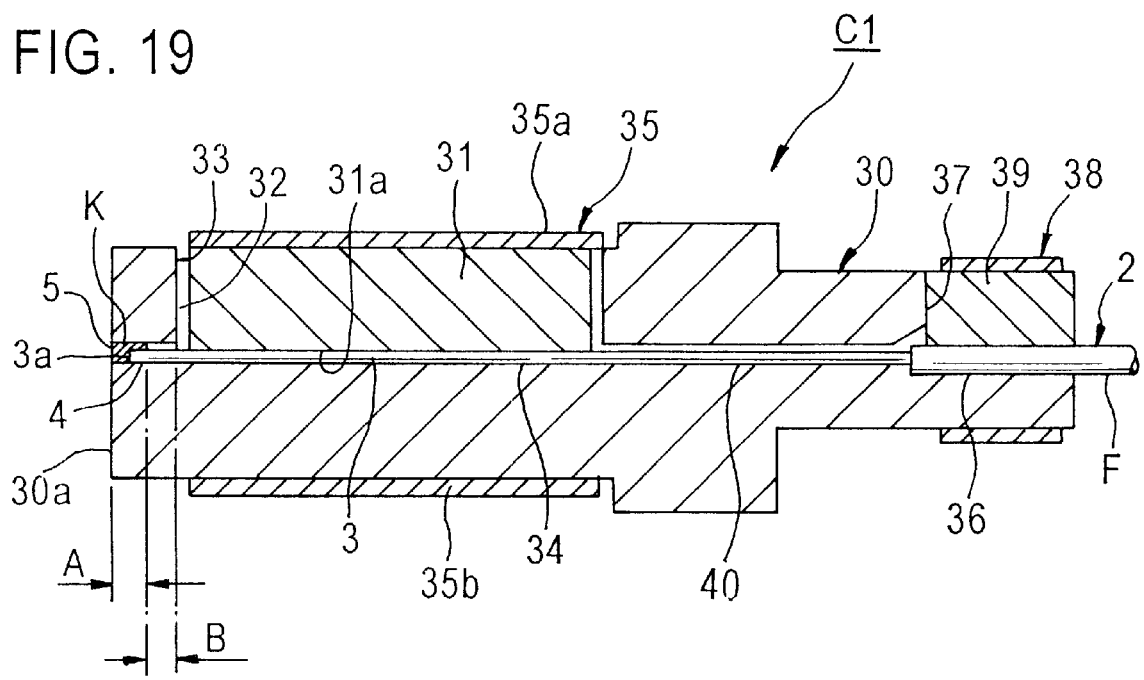
FIG. 19 is a sectional view showing a second embodiment of the optical connector in accordance with the present invention.
Figure 20:
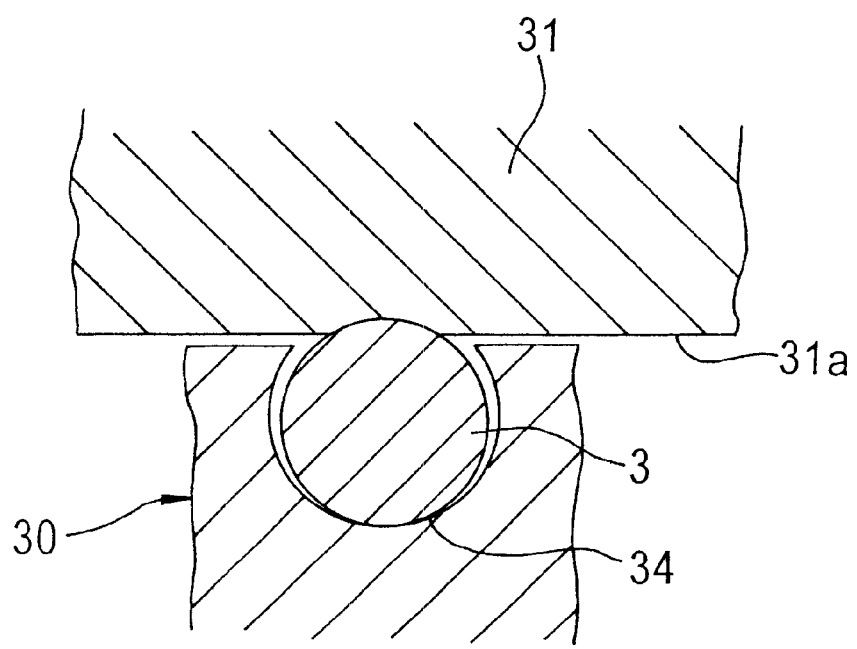
FIG. 20 is an enlarged sectional view showing a state where an optical fiber is mounted in an optical fiber alignment groove of a connector ferrule and is pressed with a clamp member from the upper side thereof.

A second embodiment C1 of the optical connector in accordance with the present invention will now be explained. As shown in FIG. 19, the connector ferrule 30 of the optical connector C1 is provided with a fiber pressing and securing member container 32 for containing a block-shaped fiber pressing and securing member 31, whereas a top portion of the container 32 is formed as a rectangular opening 33 for receiving the fiber pressing and securing member 31. Also, the bottom face of this container 32 is formed with four fiber alignment grooves 34 extending over the whole length of the container 32. Hence, if the fiber pressing and securing member 31 is inserted from the opening 33, then the lower face 31a of the fiber pressing and securing member 31 can press the four optical fibers 3 in their respective fiber alignment grooves 34 at once from the upper side thereof (see FIG. 20).

The optical connector C1 has a spring member 35 for stressing the fiber pressing and securing member 31 inserted in the container 32. The spring member 35 is constructed as a clamp member having a rectangular U-shaped cross section extending from the upper face to lower face of the connector ferrule 30, and resiliently holds the fiber pressing and securing member 31 within the container 32. As a consequence, utilizing the clamp member 35 can firmly secure the individual optical fibers 3 in the respective optical fiber alignment grooves 34 to the connector ferrule 30 with a predetermined fixing load.

When the clamp member 35 is made from phosphor bronze or cold-worked stainless steel, then it can yield a strong spring force and a high durability, thereby guaranteeing a long-term reliability in its clamp force. Also, the clamp member 35 is formed into a rectangular U form by plate-like upper piece 35a and lower piece 35b and an intermediate piece (not shown), such that the upper piece 35a of the clamp member 35 generates an appropriate clamp force.

Further, the optical connector C1 has a block-shaped coating portion pressing and securing member 39 for securing the coating portion F of the fiber ribbon 2 to the connector ferrule 30, which is separate from the fiber pressing and securing member 31 for securing the optical fibers 3 to the connector ferrule 30.

The inside of the connector ferrule 30 is provided with optical fiber guide holes 40 extending rearward from their corresponding optical fiber alignment grooves 34, and a coating portion inserting portion 36 is positioned therebehind. The coating portion inserting portion 36 has a width adapted to contain at least the coating portion F of the fiber ribbon 2. The rear end of the connector ferrule 30 is cut out so as to form a coating portion pressing and securing member container 37 disposed parallel to the above-mentioned fiber pressing and securing member container 32, within which the coating portion pressing and securing member 39 can be disposed. Also, the optical connector C1 has a spring member 38 for stressing the coating member pressing and securing member 39 in the container 37. The spring member 38 is constructed as a clamp member having a rectangular U-shaped cross section extending from the upper face to lower face of the connector ferrule 30, and resiliently holds the coating member pressing and securing member 39 within the container 37.

As in the optical connector C, the connector ferrule 30 is provided with four optical fiber positioning holes 4 continuously extending forward from their respective optical fiber alignment grooves 34, each optical fiber positioning hole 4 is provided with a refractive index matching material area A and an air layer area B, and the tip face 3a of each optical fiber 3 is buried in its corresponding optical fiber positioning hole 4 without projecting out of the front end face 30a of the connector ferrule 30.

Figure 21:
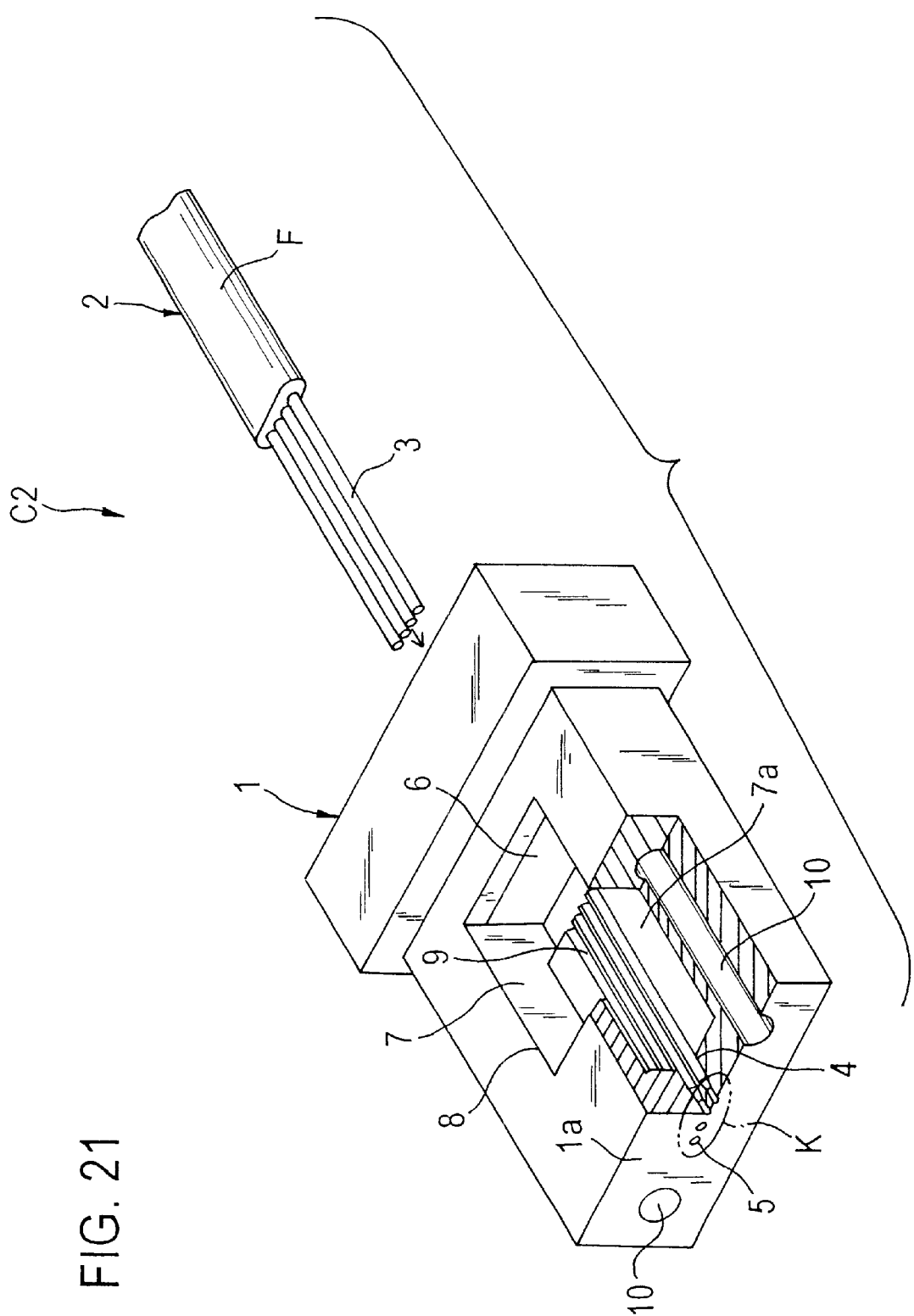
FIG. 21 is an exploded perspective view showing a third embodiment of the optical connector in accordance with the present invention.

A third embodiment C2 of the optical fiber in accordance with the present invention will now be explained. FIG. 21 is an exploded perspective view thereof. This embodiment differs from the first embodiment in the form of optical fiber positioning holes 4.

Figure 22:
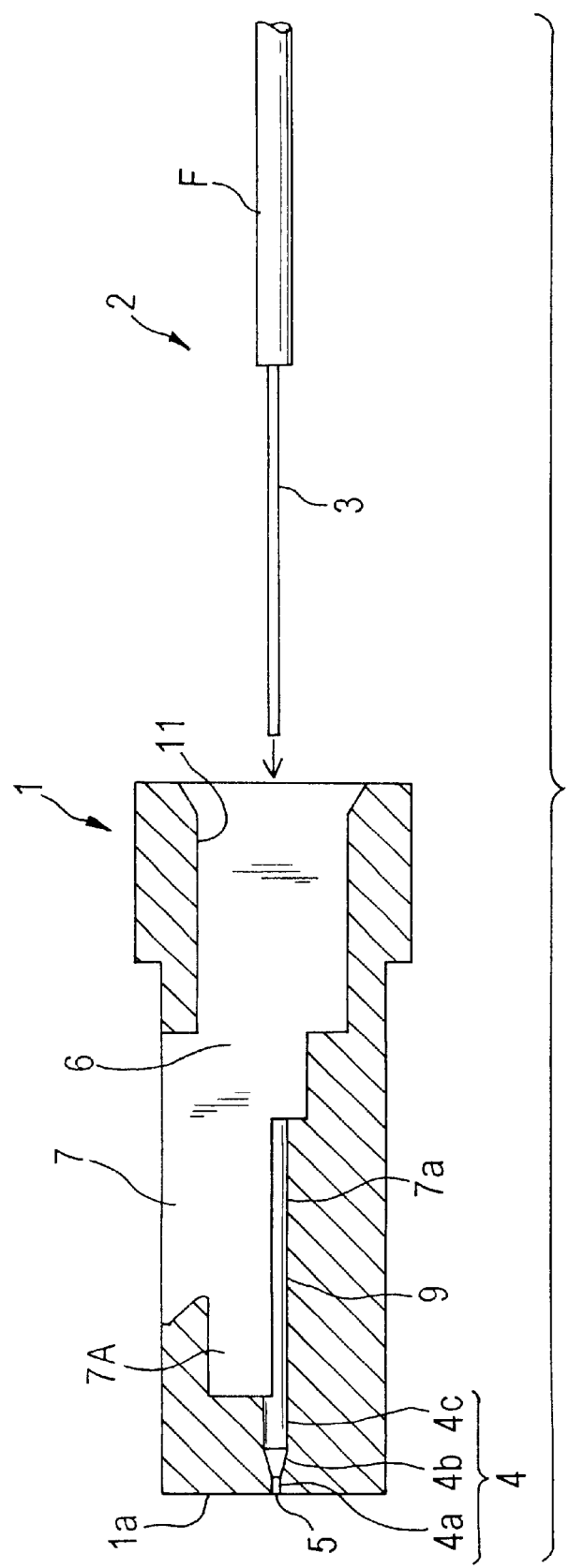
FIG. 22 is an exploded sectional view thereof.
Figure 23:
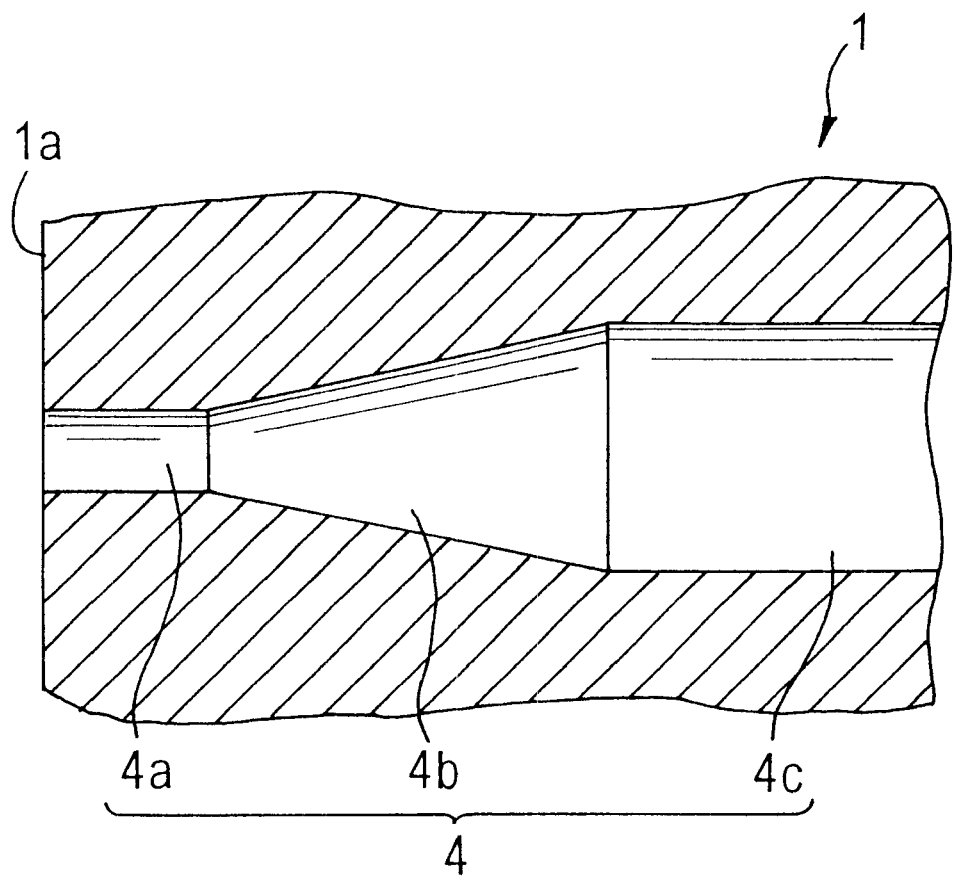
FIG. 23 is an enlarged sectional view of a main part of its connector ferrule portion.

As shown in FIGS. 22 and 23, each optical fiber positioning hole 4 comprises a cylindrical first area 4a, continuous with an optical connection port 5, having a diameter of 126 μm to 127 μm with respect to an optical fiber 3 having a diameter of 125 μm; a second area 4b shaped like a circular truncated cone whose diameter gradually increases toward the rear side; and a cylindrical third area 4c having a diameter of 250 μm to 400 μm.

Here, as shown in FIG. 23, the tip of the third area 4c is positioned near the front end face 1a of the connector ferrule 1. The first area 4a is formed up to the position distanced by 0.3 mm from the front end face 1a. The second area 4b is formed longer than the first area 4a. The vicinity of the optical connection port 5 is filled with a refractive index matching material K so as to bury the end face of the optical fiber 3.

Figure 24:
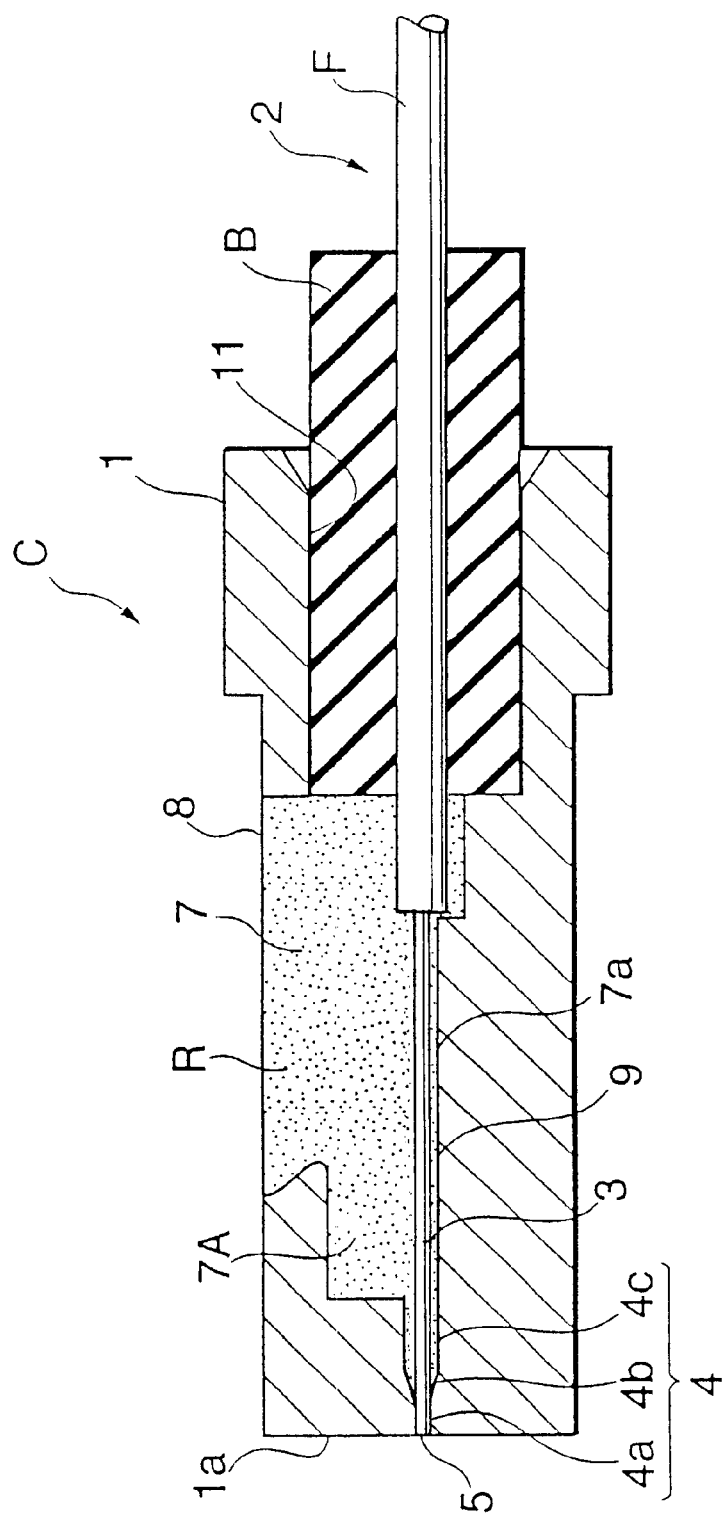
FIG. 24 is a sectional view thereof in a state assembled into an optical connector.

The rear portion of the connector ferrule 1 is provided with an optical fiber introduction port 11 for securing a rubber boot B (see FIG. 24) mounted to the coating portion F of a fiber ribbon 2. A cavity 7 has an intermediate hole portion 7A whose volume enhances toward the front end face 1a. The intermediate hole portion 7A enhances the filling area of an adhesive R while keeping the warping strength of the whole connector ferrule 1 made of a resin.

Figure 25:
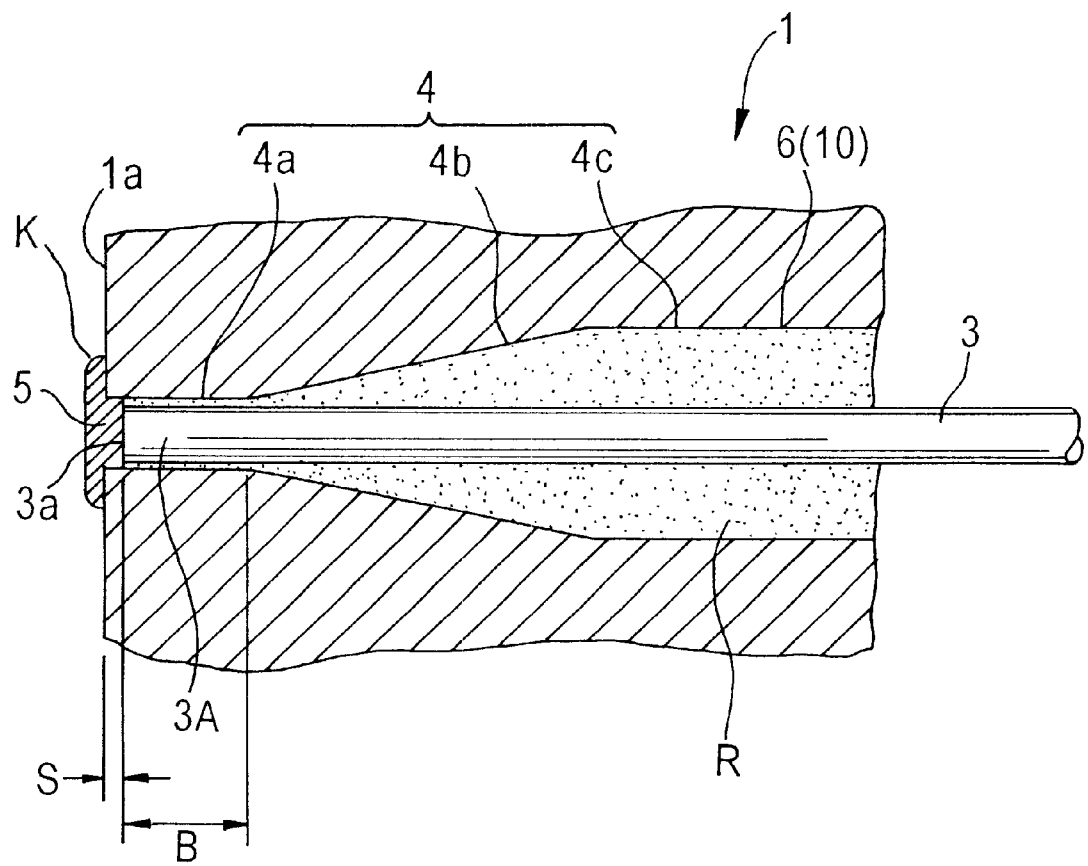
FIG. 25 is a sectional view of a main part thereof.

As a consequence of such a configuration, even when the adhesive R injected from the adhesive filling window 8 is caused to fill the second and third areas 4b, 4c by way of the cavity 7 after the tip face 3a of each optical fiber 3 is disposed so as to be buried in the first area 4a of its corresponding optical fiber positioning hole 4 of the connector ferrule 1, the adhesive R can flow into the immediate vicinity of the front end face 1a of the connector ferrule 1. Here, as shown in FIG. 25, a free portion 3A in which the optical fiber 3 is in free state is formed in the optical fiber positioning hole 4.

Preferably, the length of the first area 4a in the optical fiber positioning hole 4 is 1.0 mm or less. As a consequence, each optical fiber 3 can be secured at a part as close as possible to its end. It is further preferable for the first area 4a to have a length of 0.3 mm or less, since the amount of movement of the end face caused by the thermal expansion and contraction of the optical fiber 3 resultantly becomes so small that it can be neglected.

Figure 26:
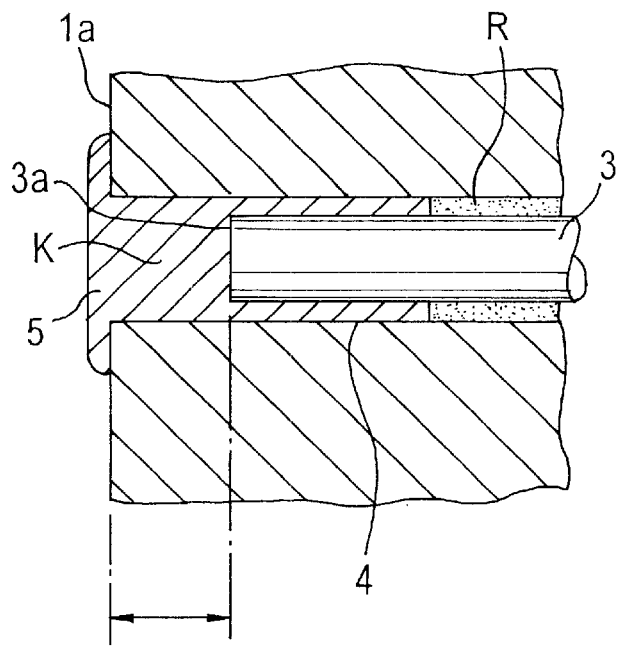
Figure 27:
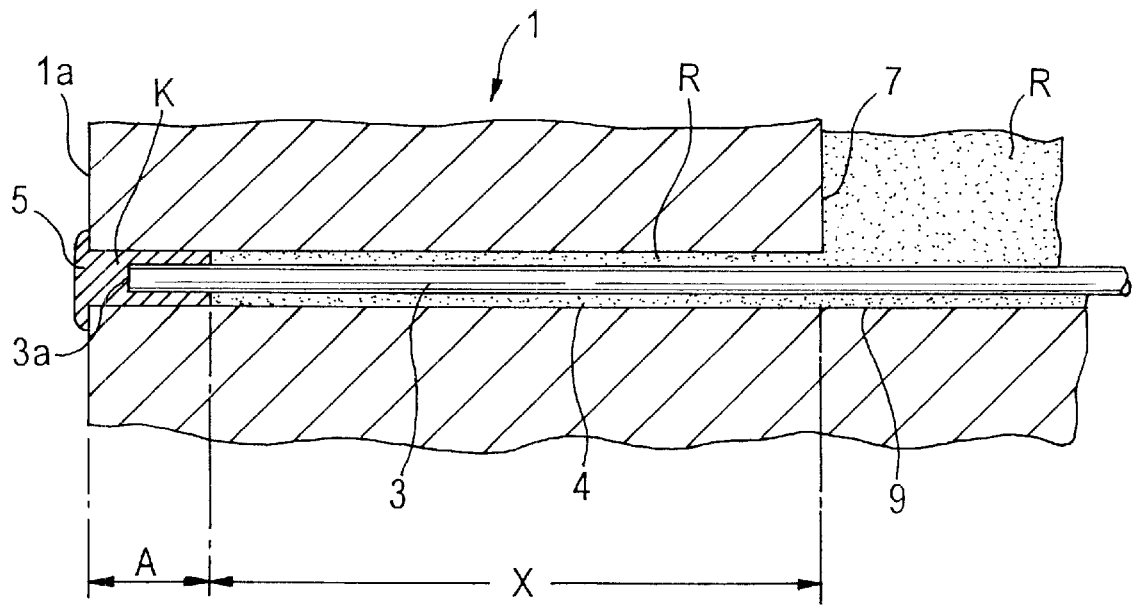

A fourth embodiment in accordance with the present invention will now be explained with reference to FIGS. 26 and 27. The fourth embodiment differs from the first embodiment in the method of securing optical fibers 3 to their optical fiber positioning holes 4. As shown in FIGS. 26 and 27, the adhesive R extends to a region immediately behind the area filled with the refractive index matching material K, so that each optical fiber 3 is bonded for securing to its corresponding optical fiber positioning hole 4 with the adhesive R up to the vicinity of the end face 3a thereof. In the optical fiber 3, the region having a length A covered with the refractive index matching material K on the optical connection port 5 side is a free area adapted to expand and contract, whereas the region having a length X continuous therewith is a fixed area.

Figure 28A:
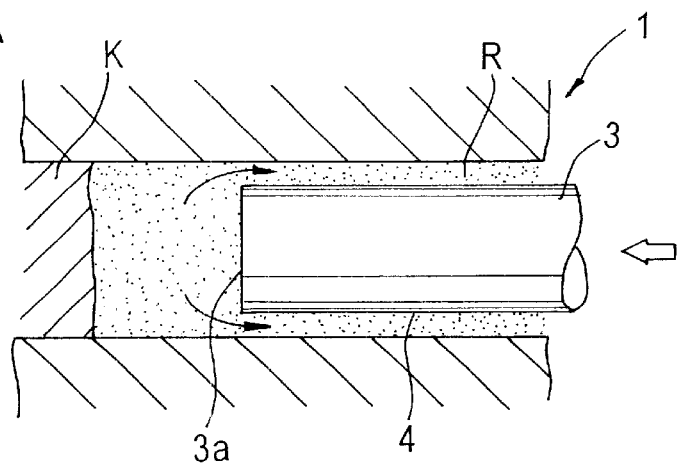
FIGS. 28A to 28C are views for explaining an insertion of an optical fiber therein.
Figure 28B:
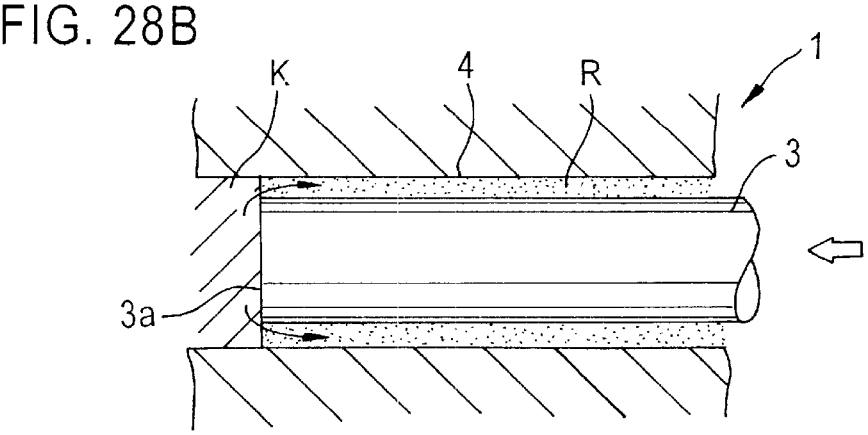
Figure 28C:
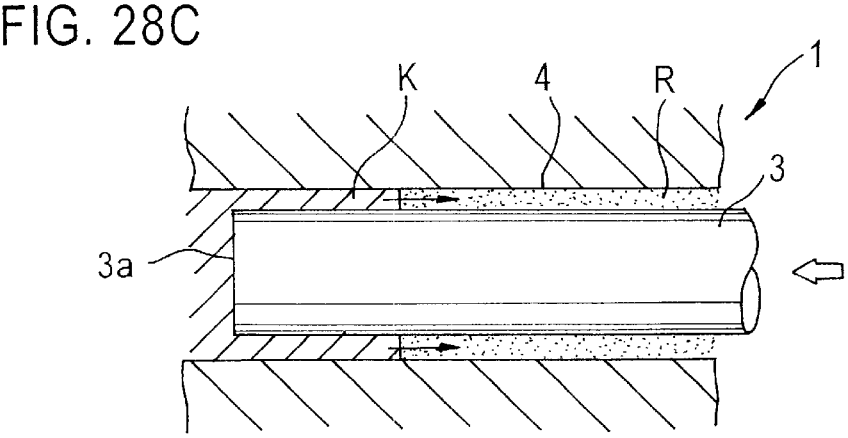

FIGS. 28A to 28C are views for explaining a method of forming the free and fixed areas. On the side closer to the optical connection port 5, the refractive index matching material K is applied to the optical fiber positioning hole 4 beforehand, whereas the remaining portion is filled with the adhesive R, and the optical fiber 3 is inserted into the optical fiber positioning hole 4 from the rear side thereof as shown in FIG. 28A. Since the viscosity of the adhesive R is much lower than that of the refractive index matching material K, the adhesive R existing in front of the end face 3a of the optical fiber 3 flows rearward through the gap between the optical fiber 3 and the optical fiber positioning hole 4 along with the insertion, while the refractive index matching material K does not move.

Then, when the end face 3a of the optical fiber 3 abuts against the refractive index matching material K as shown in FIG. 28B, the refractive index matching material K existing in front of the end face 3a flows rearward by way of the gap between the optical fiber 3 and the fiber positioning hole 4, so as to push away the adhesive R as shown in FIG. 28C. The refractive index matching material K and the adhesive R would not mix with each other. Thus, the fixed area made of the adhesive R and the free area filled with the refractive index matching material in front thereof can easily be formed.

Figure 29:
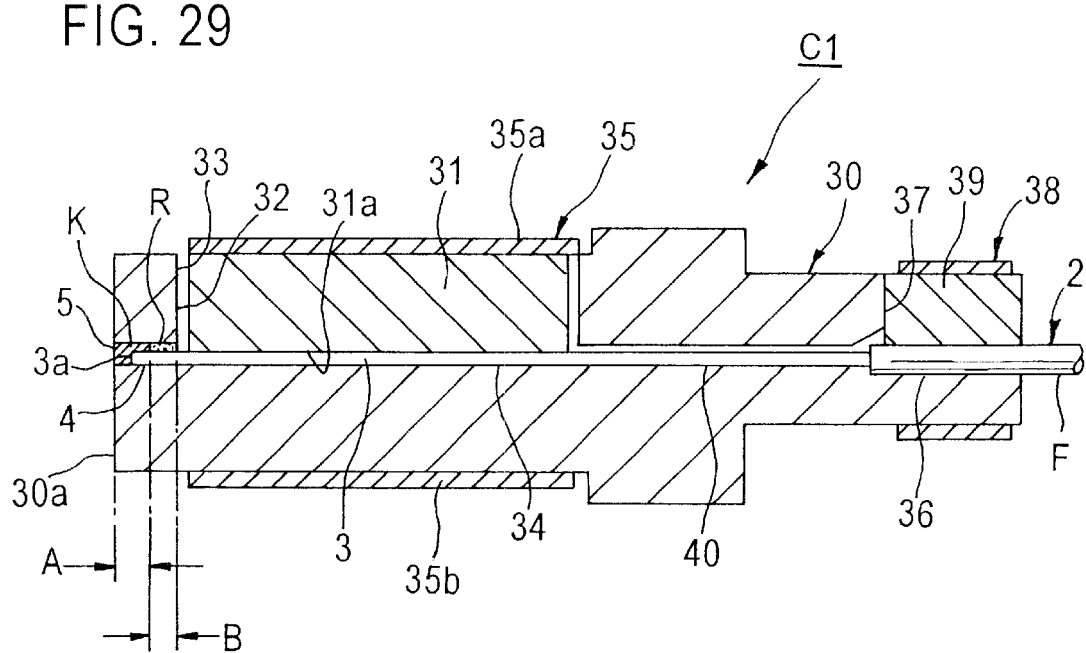

FIG. 29 is a sectional view showing a modified mode of this embodiment. In this modified mode, the air layer area in the second embodiment shown in FIG. 19 is replaced by a fixed area formed by the adhesive, so that the length of the free portion is made shorter.

Figure 30:
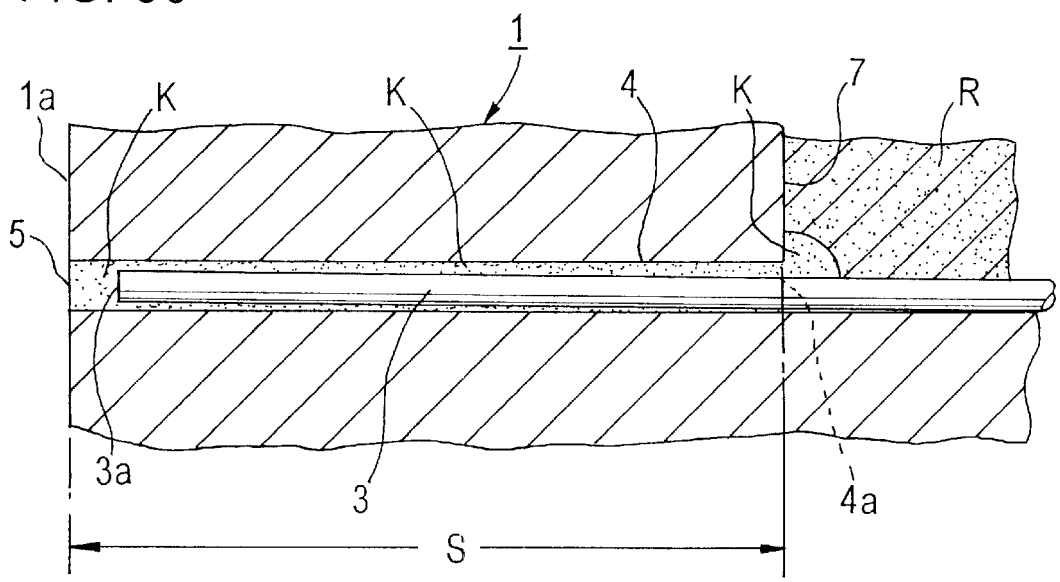
FIG. 30 is a sectional view showing a main part of a fifth embodiment of the optical connector in accordance with the present invention.

A fifth embodiment in accordance with the present invention will now be explained with reference to FIG. 30. The fifth embodiment shown in FIG. 30 differs from the first embodiment in the state within the optical fiber positioning holes 4. Namely, the optical fiber positioning holes 4 are filled with the refractive index matching material K in the fifth embodiment. Even when the optical fiber positioning holes 4 are filled with the refractive index matching material K as such, the optical fibers 3 are still in an free state within their corresponding optical fiber positioning holes 4 and free to expand and contract. As a matter of course, the optical fiber positioning holes 4 may also be filled with the refractive index matching material K in the second embodiment shown in FIG. 19.

Without being restricted to the above-mentioned various embodiments, the optical connector in accordance with the present invention is applicable not only to MT type optical connectors but also to optical connectors for optical fiber ribbon of other types and optical connectors for single optical fiber of SC type, MU type, and the like as a matter of course.

What is claimed is:

1. An optical connector comprising an optical fiber and a connector ferrule body for containing and holding an end portion of said optical fiber within an optical fiber positioning hole;

wherein an end face of said optical fiber is disposed within said optical fiber positioning hole, a part of said optical fiber with a predetermined length from the end face side thereof is held axially slidable within said optical fiber positioning hole, said optical fiber is secured by an area thereof subsequent to said predetermined length part to said connector ferrule body, and a refractive index matching material is filled said optical fiber positioning hole at least from a front end face of said connector ferrule body to the end face of said optical fiber, wherein an optical fiber alignment groove is disposed behind said optical fiber positioning hole in said connector ferrule body, said optical fiber being secured to said optical fiber alignment groove by bonding.

2. An optical connector comprising an optical fiber and a connector ferrule body for containing and holding an end portion of said optical fiber within an optical fiber positioning hole;

wherein an end face of said optical fiber is disposed within said optical fiber positioning hole, a part of said optical fiber with a predetermined length from the end face side thereof is held axially slidable within said optical fiber positioning hole, said optical fiber is secured by an area thereof subsequent to said predetermined length part to said connector ferrule body, and a refractive index matching material is filled said optical fiber positioning hole at least from a front end face of said connector ferrule body to the end face of said optical fiber, wherein an optical fiber alignment groove is disposed behind said optically fiber positioning hole in said connector ferrule body, said optical connector further comprising an optical fiber pressing and securing member for securing said optical fiber contained in said optical fiber alignment groove by pressing said optical fiber against a wall face of said optical fiber alignment groove.

3. An optical connector comprising an optical fiber and a connector ferrule body for containing and holding an end portion of said optical fiber within an optical fiber positioning hole;

wherein an end face of said optical fiber is disposed within said optical fiber positioning hole, a part of said optical fiber with a predetermined length from the end face side thereof is held axially slidable within said optical fiber positioning hole, said optical fiber is secured by an area thereof subsequent to said predetermined length part to said connector ferrule body, and a refractive index matching material is filled said optical fiber positioning hole at least from a front end face of said connector ferrule body to the end face of said optical fiber, wherein an end face of said optical fiber is treated by an edge elimination.

4. An optical connector comprising an optical fiber and a connector ferrule body for containing and holding an end portion of said optical fiber within an optical fiber positioning hole;

wherein an end face of said optical fiber is disposed within said optical fiber positioning hole, a part of said optical fiber with a predetermined length from the end face side thereof is held axially slidable within said optical fiber positioning hole, said optical fiber is secured by an area thereof subsequent to said predetermined length part to said connector ferrule body, and a refractive index matching material is filled said optical fiber positioning hole at least from a front end face of said connector ferrule body to the end face of said optical fiber, wherein said connector ferrule body has a plurality of optical fiber positioning holes each containing an optical fiber.

* * * * *